UNITED STATES PATENT OFFICE.

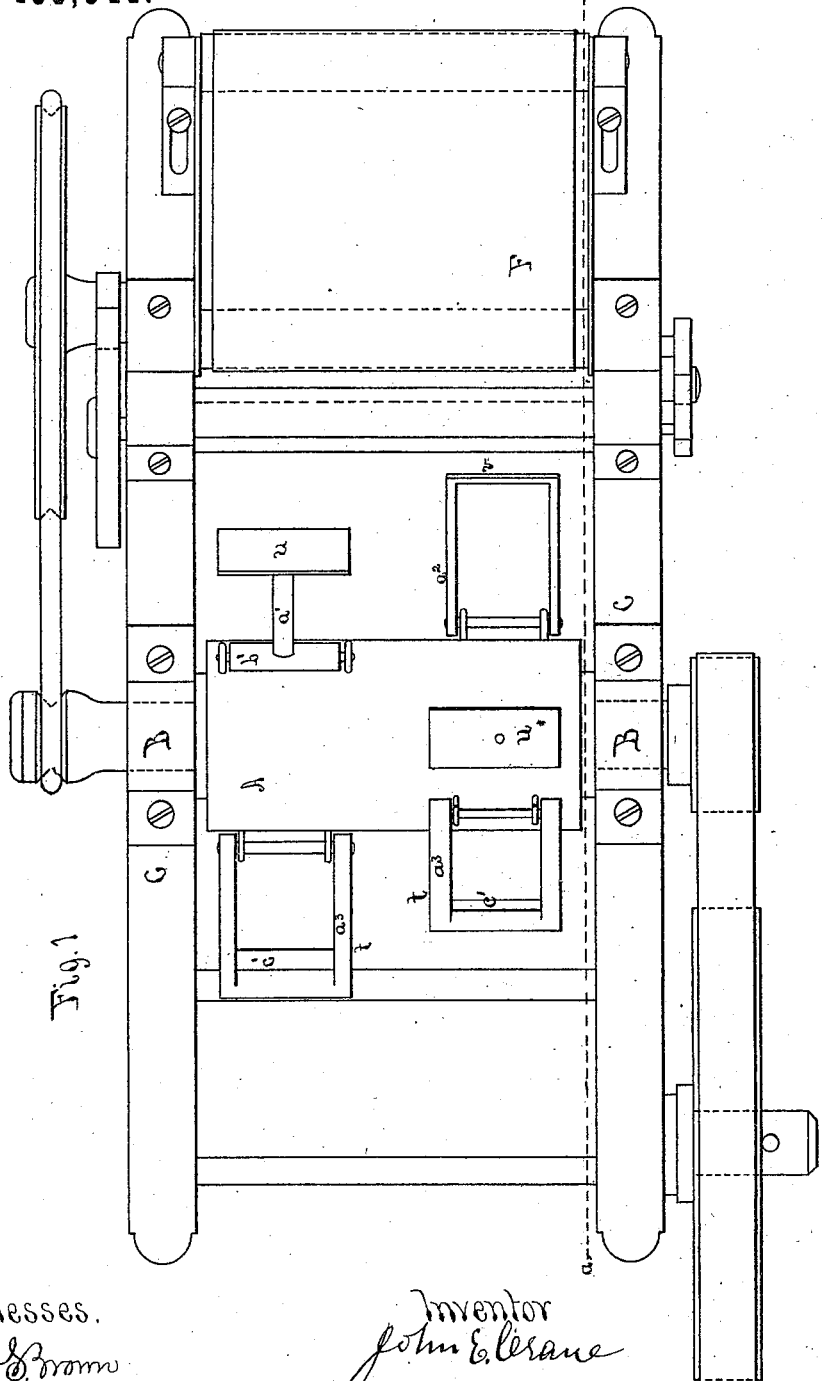

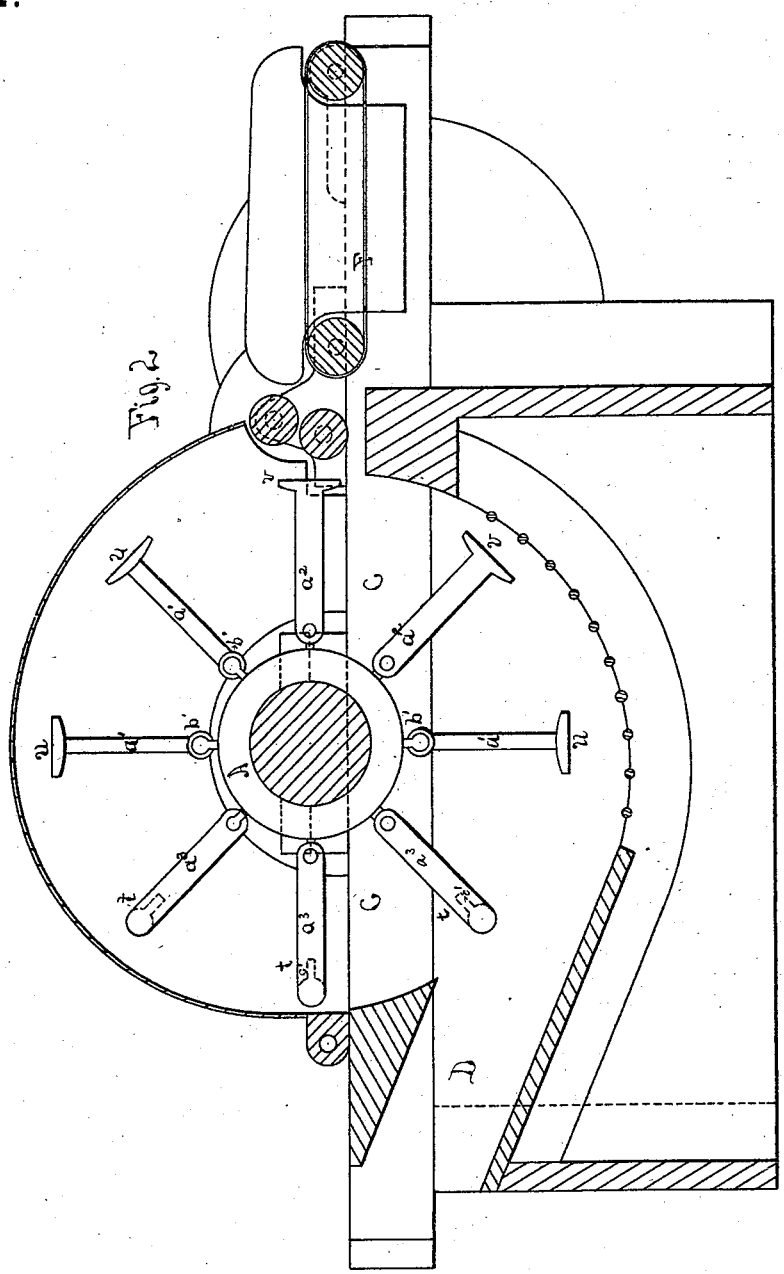

JOHN E. CRANE, (JULIA V. CRANE, ADMINISTRATRIX,) OF LOWELL, MASS.

IMPROVEMENT IN COTTON-OPENERS.

Specification forming part of Letters Patent No. 183,541, dated October 24, 1876; application filed March 21, 1874.

*To all whom it may concern:*

Be it known that I, JOHN E. CRANE, of Lowell, in the county of Middlesex, and State of Massachusetts, have invented certain new and useful Improvements in Cotton-Openers, of which the following is a full, clear, and exact description, reference being had to the accompanying drawings, making part of this specification, in which—

Figure 1 is a plan or top view with the cover removed, and Fig. 2 a sectional elevation on the line $a\ b$ of Fig. 1, showing one end of the operating cylinder or shaft, and most of the other parts.

This invention relates to machinery for opening and cleaning cotton, and has for its object to do the work in a superior manner without injury to the cotton.

This invention consists of certain new and useful improvements in hinged or pivoted and yielding bladed beaters for opening cotton as it passes the feed-rolls of a cotton-opener, the blades of said hinged beaters being arranged to strike or deliver their blows while rotating so near the feed-rolls as to act in connection with the rolls, the latter holding the cotton, and the beaters striking and stripping the cotton from the rolls as fast as they deliver it to the beaters, said bladed beaters being in all cases hinged or pivoted to the periphery of the shaft or cylinder, about as shown in the drawings, and so that each of said bladed beaters will yield or fall back when they strike or impart their blows to the cotton fed to them substantially as described, and when the cylinder of bladed beaters is rotated rapidly, and the beaters are thrown out radially by centrifugal force.

In the said drawings, A represents the shaft or cylinder, or beater connecting and carrying device, having journals B, supported in bearings on the frame C, cased up in the usual way, and provided with a common screen or rack beneath the cylinder, and a delivery trunk or spout, D, a common feed-apron, F, and well-known feed connecting and operating mechanism, which may be driven by a pulley on one end of the main cylinder-shaft. To the periphery of the shaft or cylinder A, or at or close to the circumferential surface of such cylinder, I hinge the several bladed beaters $t\ u\ v$, each having about the same degree of yielding action, and other good qualities which render them capable of operating to advantage. Their predetermined and peculiar construction and yielding action prevent cotton from lapping or winding around them, and leave them with reduced air-resisting surfaces. The hinged and yielding bladed beater $t$ has side arms $a^3$, by which it is hinged to the periphery of the cylinder. This bladed beater $t$ has a rounded operating end or blade, and a web, $c'$, extending inward from said round rod, sufficient to prevent the fibers of cotton lapping or winding around it, as they would be liable to do if the web was omitted. The hinged and yielding bladed beater $u$ has a wide blade like the common bladed beater, but it has a center arm, $a^1$, and a hinging hub, $b'$, by which it is hinged to the periphery of the shaft or cylinder, as shown. This beater $u$ has also a good clearance for air, the center arm being but a small obstruction, and it has a great capacity to yield or fall back as it strikes the fed cotton. The yielding bladed beater $v$ has a blade like $u$, but, instead of a center arm, it has side arms $a^2$, by which it is hinged to the periphery of the cylinder, as shown.

By constructing the aforesaid beaters as shown, and by hinging them to the periphery of the shaft or cylinder, as at $b'$, their length from their pivotings to their operating blades will be greatly in excess of beaters hinged to rods, arms, flanges, or supports so far from the periphery of the cylinder as to allow such beaters to revolve each on its axis or pivoting rod, or to nearly revolve, and such excess of length of my said beaters hinged to the periphery of the shaft gives them great advantage in striking the fed cotton over beaters of shorter leverage. The longer the hinged beater from its pivoting to its operating blade the more forcible will be the blow imparted by its blade when thrown out by centrifugal force; and therefore this machine, or the cotton-openers, having my said improved bladed beaters constructed and applied as described, will be very potent and effectual for opening cotton, however much it may be matted or in hard bunches.

In all cases the operating blades of my said beaters extend from one arm to the other, or project in opposite directions from the center arm, as shown.

I claim as my invention—

In combination with the feed-roll of a cotton-opener, the yielding beaters $t$ $u$ $v$, constructed and applied as described, with operating-blades, a rod with arm or arms $a^1$ $a^2$ $a^3$, hinged to the periphery of the shaft or cylinder A, and operating substantially as and for the purpose described.

JOHN E. CRANE.

Witnesses:
WM. S. BROWN,
NATHAN BROWN.